United States Patent
Munson et al.

[15] 3,654,601
[45] Apr. 4, 1972

[54] VEHICLE TIRE PRESSURE WARNING SYSTEM

[72] Inventors: Robert V. Munson; Patrick T. Thayer, both of San Antonio, Tex.

[73] Assignee: Thayer Corporation, San Antonio, Tex.

[22] Filed: Mar. 10, 1970

[21] Appl. No.: 18,210

[52] U.S. Cl. ............................. 340/58, 335/154, 200/61.25
[51] Int. Cl. ..................................................... G08b 21/00
[58] Field of Search ........... 340/58; 200/61.22, 61.25, 61.26; 335/151, 153, 154

[56] References Cited

UNITED STATES PATENTS

| | | |
|---|---|---|
| 2,629,086 | 2/1953 | Ainsworth et al. ..................... 340/58 |
| 3,521,230 | 7/1970 | Poole ..................................... 340/58 |
| 1,683,343 | 9/1928 | Gartner ................................... 340/58 |

*Primary Examiner*—Alvin H. Waring
*Attorney*—Giles C. Clegg, Jr.

[57] ABSTRACT

For detecting a reduction of pressure in the pneumatic tire of a vehicle. A magnet device is mounted for rotation with the vehicle wheel to pass in close proximity to a magnetically operated switch. The magnet device is responsive to the pressure within the tire to move the magnet in position to actuate the switch when the pressure falls below a predetermined value. The switch is connected in a circuit to produce a warning signal to the vehicle operator.

10 Claims, 4 Drawing Figures

PATENTED APR 4 1972 3,654,601
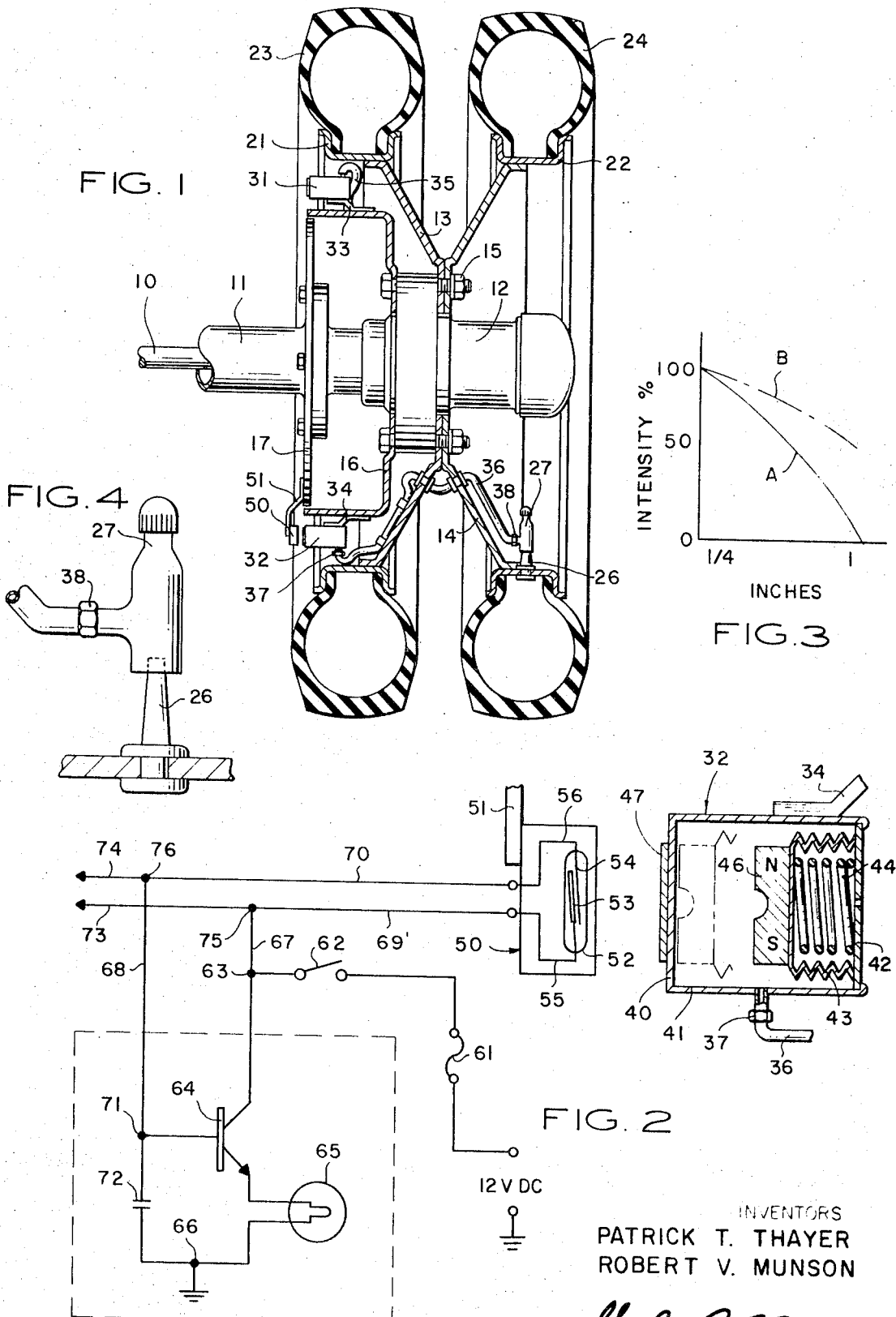
INVENTORS
PATRICK T. THAYER
ROBERT V. MUNSON
ATTORNEY 3,654,601

VEHICLE TIRE PRESSURE WARNING SYSTEM

BACKGROUND OF THE INVENTION

This invention relates to a system and apparatus for detecting and indicating a pressure reduction in the pneumatic tires of a vehicle.

It is important to maintain a selected air pressure within the tires of a vehicle during operation thereof; as it is well known that extended operation of a vehicle, particularly at high speeds, can be hazardous if the tires are under inflated. For example, operation of the vehicle at low pressure may result in reduced manueverability and control of the vehicle. Operation at low pressure over substantial periods of time may result in breakdown of the tire walls, increasing the likelihood of a blowout. Operation of tires at low pressure causes heat build-up which, in extreme cases, may produce a fire hazard. In other cases, the heat build-up, coupled with the resultant increase in pressure, may result in a tire failure. Since the loss due to a tire failure may be very high in terms of injury to occupants or loss of life, damage or destruction of cargo, and damage or destruction of the vehicle itself, it is very desirable to provide means for detecting promptly a reduction of tire pressure below normal values, and providing a warning signal to the vehicle operator so that the condition causing pressure loss may be corrected.

Since components of the system must necessarily be associated with the vehicle wheels, such components must be sufficiently rugged to withstand the environment and yet be reliable in operation.

An object of this invention is to provide a simple and reliable system and apparatus for detecting reduced pressure in an inflatable device and producing a responsive warning signal.

Another object of this invention is to provide a warning system and apparatus which is readily adaptable to any vehicle which uses pneumatic tires.

A further object of this invention is to provide a system and apparatus in which the elements of the system are of maximum simplicity and where its liability to failure, maladjustment or damage is reduced to a minimum.

These objects are accomplished with apparatus for use with a vehicle including a magnetic pressure sensing device adapted to be mounted on the vehicle wheel and a magnetically operated switch mounted on a fixed portion of the vehicle. The pressure sensing device comprises a chamber means communicating with a tire chamber including a fixed wall and a movable wall. A magnet is mounted on the movable wall, movable rectilinearly relative to the fixed wall, with the movable wall and magnet being normally urged toward the fixed wall. The tire pressure communicated with the chamber moves the magnet away from the fixed wall. The magnetic shunt member mounted adjacent to the fixed wall concentrates the magnetic flux. The magnetic switch is mounted to be actuated by the pressure sensing device only when the magnet is positioned adjacent to the fixed wall; and the magnetic switch is connected in a circuit for energizing a warning device when the switch is actuated.

The novel features of the invention, as well as additional objects and advantages thereof, will be understood more fully from the following description when read in connection with the accompanying drawing, in which:

FIG. 1 is a diagrammatic sectional view of a vehicle dual wheel unit mounted on an axle, showing the location of several components of the warning system;

FIG. 2 is a diagrammatic illustration of certain components of the system and a schematic diagram of an electrical signalling circuit;

FIG. 3 is a curve illustrating change in magnetic intensity under conditions of operation; and FIG. 4 is a detail view of the valve stem arrangement of FIG. 1.

DESCRIPTION OF THE PREFERRED EMBODIMENT

FIG. 1 of the drawings illustrates a dual wheel assembly, which may be of generally conventional construction, such as may be used on a truck or a bus for example. While this dual wheel assembly is chosen for the purpose of illustrating and describing the invention, it will be apparent that the pressure warning system is adapted for use with single or multiple wheel units for any type of vehicle.

Referring to FIG. 1, a rotating axle 10 extends through the axle housing portion 11 which is nonrotatably connected to the vehicle chassis to support the wheel assembly. A rotating hub 12, mounted on the axle housing 11 by means of suitable bearings, is driven by the axle 10. Inner and outer wheel discs 13 and 14 are connected to each other and to the hub 12 by suitable means such as bolt assemblies 15; and a brake drum 16 may be mounted on the hub, as viewed in the drawings, by means of the same bolt assemblies 15. An annular plate 17 is mounted on the fixed axle housing 11, being received within the rim of the brake drum 16; and this plate 17 will conventionally support the brake shoes which coact with the brake drum. The wheel disc 13 carries a rim 21 and the wheel disc 14 carries a rim 22; and inflatable pneumatic tires 23 and 24 are mounted on the respective rims 21 and 22 in a conventional manner.

A conventional valve stem 26 is shown for the tire 24; and a special valve stem 27 mounted on the stem 26 includes a conventional valve for the purpose of inflating the tire and also serves to connect the tire to the pressure warning system as will be described. A similar valve stem, not shown in the drawings, is provided for the tire 23.

A pair of identical pressure sensitive magnetic actuators 31 and 32 are mounted on the outer surface of the brake drum 16 by means of suitable brackets 33 and 34 respectively for rotation with the brake drums. Preferably, these actuators are mounted at diametrically opposite points on the drum and are mounted in a position to pass adjacent to a magnetically operated switch 50 which is mounted on the fixed plate 17 by means of a bracket 51. The actuators 31 and 32 are responsive, respectively, to the pressures within the tires 23 and 24; and these actuators are continuously communicated with the respective tire chambers by means of suitable conduits. Referring to the actuator 32 in FIG. 1, the actuator housing is connected to the tire 24 by means of tubing 36 which may be suitably connected to the wheel discs 13 and 14 and which is connected to the valve stem 26. In the illustrated form, the valve stem 27 is a special T stem threaded onto the conventional stem 26 and designed to receive a conventional valve core. In assembly, the valve core is removed from the stem 26 and its function is performed by the valve in the special stem 27. The special T stem provides an externally threaded boss or branch, for example to which the tubing 36 is connected by means of a fitting 38. The tubing 36, then, is in constant communication with the tire chamber, and the tire is inflated in a conventional manner through the stem 27. Tubing 35 associated with the actuator 31 couples this actuator to the corresponding valve stem for the tire 23.

In FIG. 2 of the drawings, the magnetic actuator 32 and the magnetically operated switch 50 are shown in the same relative position illustrated in FIG. 1, where the actuator 32 would be just passing the switch 50.

As best seen in FIG. 2, the actuator 32 consists of a cup-shaped housing including an end wall 40 and side walls 41, which may be cylindrical for example. The housing is fabricated of a suitable non-magnetic material, such as brass. With reference to FIG. 1, the actuator 32 is preferably mounted so that the end wall 40 lies in a plane perpendicular to the rotational axis and defined generally by the plate 17 and the lip of the brake drum 16. The end of the actuator opposite from the end wall 40 is defined by a wall plate 42 upon which is mounted an expansible bellows 43, with a spring 44 being enclosed within the bellows and the bearing on the wall plate 42 to urge expansion of the bellows toward the end wall 40.

The bellows is fabricated of a suitable non-magnetic material such as brass. The end plate 42 and the bellows 43 define, with the housing walls 40 and 41, a sealed chamber 45. The conduit 36 is connected by means of a fitting 37 to a suitable threaded nipple extending from the housing wall 41, to communicate the chamber 45 with the chamber of the tire 24. The wall plate 42 is provided with a suitable vent hole to vent the bellows chamber containing the spring 44. A permanent manet 46, fabricated of Almico for example, is mounted on the bellows wall which confronts the end wall 40 of the actuator; and this magnet is movable rectilinearly toward and away from the end wall 40 in response to the pressure within the chamber 45. The magnet 46 is preferably in the form of the bar magnet having N and S poles spaced transversely relative to the direction of movement of the magnet within the actuator.

A shunt member 47, preferably a bar of soft iron, is secured to the outer face of the end wall 40 to concentrate the magnetic flux produced by the magnet 46, as will be described.

The magnetically operated reed switch 50 consists, for example, of an envelope 52 for hermitically sealing a pair of switch contacts 53 and 54 including biasing means for maintaining the contacts in a normal open or non contacting condition. At least one of the contacts, contact 53 for example, is fabricated of a magnetizable material whereby the contacts are closed under the influence of a magnetic field. The envelope 52 and leads 55 and 56 connected respectively to the contacts 53 and 54 may be suitably encased in a housing fabricated of epoxy material for example, to facilitate the mounting of the switch 50 on the plate 17 by means of suitable bracket 51. In the assembled relation, illustrated in both FIGS. 1 and 2, the switch is mounted so that the envelope 52 lies close to the above described plane defined by the plate 17 and the brake drum lip 16. Accordingly, as the wheel unit rotates, the shunt members 47 of the actuators 31 and 32 pass in close proximity to the envelope 52.

The switch 50 serves to turn on an appropriate warning device, such as an indicator light or sound warning device or both. While the switch 50 may be connected directly in series with such a warning device, it is likely, at higher speeds of operation, in the vehicle application described above, that the "on" time of the switch would not be sufficient to operate the signal device. Accordingly, a "pulse stretcher" circuit is provided for actuating the warning device in the preferred embodiment.

Referring to the schematic circuit diagram of FIG. 2, there is shown a source of direct current supply voltage, such as a 12 volt battery conventionally provided in automotive vehicles, having one side connected to common, denoted schematically as ground, and having the other side connected through a fuse 61 to one side of a manual switch 62, such as might be found on the vehicle dashboard, for selectively activating and deactivating the pressure warning system. The other side of the switch 62 is connected to the juncture 63. An electronic switching device 64, shown as a transistor switching device, is connected in series with a warning device 65, shown as an incandescent lamp, between the juncture point 63 and a juncture point 66. The juncture point 66 is connected to ground. The magnetically operated switch 50 is connected in a branch circuit by lines 67, 69, 68 and 70 between the juncture 63 and a juncture 71, with the juncture 71 being connected to the juncture 66 and to ground through a capacitor 72. The juncture 69 is also connected to the base electrode for the transistor switching device 64, so that the emitter-base bias is provided across the capacitor 70.

An additional magnetically operated switch may be connected in parallel with the switch 50 through lines 73 and 74 which are connected to the lines 67 and 68 respectively, through junctures 75 and 76. Thus, for example, the magnetically actuated switches for the four wheels of an automobile may be connected to a common pulse stretcher circuit as described above. Alternatively, of course, a separate pulse stretcher circuit and warning lamp 65 could be provided for each of the tires of the vehicle to provide an immediate indication of the location of the tire which is losing air pressure.

In operation, each of the magnetic actuators provided with a vehicle is selected so that normal tire pressure, which is communicated to the chamber 45, acts on the bellows 43 compressing the spring 44 to position the magnet 46 in the full line position shown in FIG. 2. In this position, the rotational path of the magnet 46 is sufficiently spaced from the switch 50 that the magnetic field is not sufficiently strong to close the switch contacts.

When the tire pressure decreases to a point approaching a hazardous condition, the force provided by the spring 44 relative to that provided by the decreasing pressure within the chamber 45 will have moved the magnet to a position adjacent to the wall 40, as shown in the broken lines in FIG. 2. In this position the magnetic field, concentrated through the shunt member 47, is of sufficient intensity to close the contacts of the reed switch each time the actuator passes adjacent to the switch. Each pulse produced by the closing of the switch contacts 53, 54 produces an increase in the charge of the biasing capacitor 22, until the emitter is forward biased sufficiently to cause the transistor switching device 64 to conduct or "turn on" whereby the warning device 65 is connected across the power supply.

It has been observed by applicants that the provision of the magnetic shunt member 47 provides for significantly improved performance and reliability of the actuator, over that of a similar actuator without the shunt member, particularly where the range of movement of the magnet 46 is quite small. It will be appreciated that, in a vehicular system as described, the size of the actuator is necessarily limited by the available mounting space provided in a wheel structure.

FIG. 3 of the drawings is a curve representing changes in the intensity of the magnetic field at the contacts of the switch 50, in relation to movement of the magnet 46 from the off position, illustrated by the full line position in FIG. 2, and the on position, illustrated by the broken line position in FIG. 2. The curve of FIG. 3 is illustrative of a situation where the magnet is spaced, for example, one inch from the switch contacts 52 and 53 in the off position, and spaced one-fourth inch from the contacts in the on position. The intensity of the magnetic field produced by the magnet 46 at the switch contacts is assumed to be 100 per cent when the magnet is in the on position.

The curve B of FIG. 3 represents the change in intensity for an actuator which does not include a magnetic shunt member 47. For this situation it is seen that the magnetic intensity drops from 100 per cent, when the magnet is in the on position, to approximately 50 per cent when the magnet moves three-fourth inch to the off position. Curve A of FIG. 3 represents the performance of an actuator which includes a shunt member 47. Again, assuming the intensity at the switch contact to be 100 per cent when the magnet is in the on position, it is seen that the intensity drops to a very low percentage value when the magnet is moved three-fourth inch to the off position.

The significance of the foregoing is that, with the magnetic shunt member 47, the actuator is substantially more sensitive to changes in pressure and is a more reliable magnetic switch operator for the described system.

While the warning device is shown as an incandescent lamp 65, which may be appropriately located to be readily observed by the vehicle operator, the warning device may appropriately consist of an audible device such as a horn or buzzer, or both visible and audible warning devices may be provided to be operated by the same warning circuit.

For the described dual wheel unit, a single magnetically operated switch 50 is provided for operation by either of the actuators 31 or 32 which are associated respectively with the tires 23 and 24. If it is desired to provide more frequent pulses for the pulse stretcher circuit, additional magnetically operated switches 50 might be mounted on the plate 17 and connected in parallel with the common pulse stretcher circuit.

The illustrated arrangement of the special valve stem 27, and of the tubing 36 with the readily disconnectable fittings 37 and 38, is provided for convenience of both installation and operation of the vehicle. The provision of the special stem 27 for attachment to the conventional stem 26 facilitates the installation of the warning system in a vehicle; and also provides a means for readily disconnecting the entire warning system from the tire in the event that a leak should occur in the tubing or in the actuator 32. In this event, the special valve stem may be disconnected and the valve core replaced in the conventional stem so that the vehicle may continue in service pending repair or replacement of the warning system components. In situations where it is necessary to replace a wheel with the spare, the tubing 36 is readily disconnected from the valve stem assemblies at the fitting 37 so that the deflated tire may be removed and the spare mounted. This arrangement would be particularly advantageous for wheeled vehicles such as service trucks or passenger automobiles. Such vehicles may then continue in service until the necessary tire repairs are made at which time the warning system is readily reconnected.

Although the invention has been described with reference to a particular preferred embodiment, many changes and modifications will become apparent to those skilled in the art in view of the foregoing description which is intended to be illustrative and not limiting of the invention defined in the claims.

What is claimed is:

1. For use with a vehicle having a wheel mounted inflatable tire pressure sensing means adapted to be mounted on a wheel for rotation therewith; said pressure sensing means comprising sealed chamber means for communication with the tire chamber, said sealed chamber means defining one fixed wall and a confronting movable wall each of non-magnetic material, means normally urging said movable wall toward said fixed wall, magnet means mounted on said movable wall for rectilinear movement relative to said fixed wall, said magnet means being urged away from said fixed wall by the pressure within said chamber, and a magnetic shunt member of ferromagnetic material mounted adjacent to said fixed wall for concentrating the magnetic flux of said magnetic means;

a magnetic operated switch adapted to be mounted on the vehicle in proximity to the plane of rotation of said sensing means fixed wall; said switch means being operated in response to the magnetic field produced by said pressure sensing means when said magnetic means lies adjacent to said fixed wall;

and circuit means for connection to a source of electrical energy including said magnetically operated switch and an electrically operated warning device.

2. Apparatus as set fourth in claim 1 wherein said sealed chamber means is defined by a cup-shaped case and a bellows mounted in sealed relation at the open end of said case and extending into the case chamber, said bellows defining said movable wall; and spring means mounted within said bellows urging said bellows and the magnet means mounted thereon into said case toward the fixed wall defined by a base wall of said cup-shaped case.

3. Apparatus as set forth in claim 2 wherein said magnetic shunt member comprises a bar of magnetizable metal mounted on the exterior surface of said fixed wall.

4. Apparatus as set forth in claim 1 wherein said magnet means defines magnetic poles spaced transversely relative to the direction of rectilinear movement of said magnet; and wherein said magnetic shunt means is defined by a bar of ferromagnetic material oriented relative said poles to concentrate the magnetic flux produced by said magnet means adjacent to the plane of said fixed wall.

5. Apparatus as set forth in claim 1 wherein said circuit means includes an electronic switching device connecting said warning device in series with said source of electrical energy, and a branch circuit connecting said magnetically operated switch in series with said electronic switching device and said source of electrical energy to effect the switching of said electronic switching device.

6. Apparatus as set forth in claim 5 wherein said electronic switching device comprises a transistor; and wherein said branch circuit includes a capacitor connected in series with said magnetically operated switch and the base electrode of said transistor to control the switching voltage of the transistor.

7. In combination with a vehicle having a plurality of rotatable wheels each carrying an inflatable tire;

a pressure sensing device mounted on each wheel for rotation therewith; conduit means communicating each pressure sensing device with a respective tire chamber;

each pressure sensing means comprising a sealed housing providing one fixed wall and the confronting movable wall each of non-magnetic material, spring means urging said movable wall toward a fixed wall, a permanent magnet mounted on said movable wall for rectilinear movement toward and away from said fixed wall, and a magnetic shunt member of ferromagnetic material mounted on said fixed wall;

a plurality of magnetically operated switches mounted on said vehicle, one switch being mounted adjacent each of said wheels in proximity to the plane of rotation of the respective sensing device fixed wall; each of said switches being operated in response to the magnetic fields produced by a sensing device when a respective magnet means is positioned adjacent to the fixed wall;

and circuit means including an electrically operated warning device and an electronic switching device for connection to the vehicle source of electrical energy; and each of said magnetically operated switches being connected to said electric switching device for actuating said switching device.

8. Apparatus as set forth in claim 7 wherein each pressure sensing means comprises a cup-shaped housing defining the one fixed wall and a bellows closing the open end of the housing and defining the movable wall carrying said magnet; said cup-shaped housing and bellows being fabricated of a non-magnetic material;

and said circuit means including said electrically operated warning device and said electronic switching device in series with the vehicle source of electrical energy, said electronic switching device comprising a transistor; said plurality of magnetically operated switches being connected in parallel with each other; and said parallel connected magnetically operated switches being connected in series with the transistor base electrode and said vehicle source of electrical energy for controlling the switching voltage of said transistor.

9. A pressure sensing device, adapted for connection to an inflatable chamber, for use with a magnetically operated switch comprising means defining a sealed chamber providing a fixed wall and a confronting movable wall each of non-magnetic material; spring means normally urging said movable wall toward said fixed wall; a permanent magnet mounted on said movable wall for rectilinear movement toward and away from said fixed wall, said magnet being urged away from said fixed wall by the pressure within said chamber means; and a shunt member of ferromagnetic material mounted on said fixed wall for concentrating the magnetic flux produced by said magnet.

10. Apparatus as set forth in claim 9 wherein said sealed chamber is defined by a cup-shaped housing, providing said fixed wall and a bellows mounted in the open end of said cup-shaped housing, providing said movable wall; said housing and bellows being fabricated of non-magnetic materials;

said magnet providing poles spaced transversely relative to the direction of rectilinear movement of said magnet; and said magnetic shunt member being disposed in a plane normal to said direction of rectilinear movement.